Aug. 16, 1966 E. E. BROWN ETAL 3,266,746

QUICK RELEASE TAPE SPOOL

Filed July 27, 1964 2 Sheets-Sheet 1

INVENTORS
ELVIN E. BROWN
FREDERICK W. JOHNSON
BY
Moody and Kintzinger
ATTORNEYS

Aug. 16, 1966 E. E. BROWN ETAL 3,266,746

QUICK RELEASE TAPE SPOOL

Filed July 27, 1964 2 Sheets-Sheet 2

INVENTORS
ELVIN E. BROWN
FREDERICK W. JOHNSON
BY
Moody and Kintzinger
ATTORNEYS

3,266,746
QUICK RELEASE TAPE SPOOL

Elvin E. Brown, Marion, and Frederick W. Johnson, Cedar Rapids, Iowa, assignors to Collins Radio Company, Cedar Rapids, Iowa, a corporation of Iowa Filed July 27, 1964, Ser. No. 385,197
4 Claims. (Cl. 242—68.3)

Figure 1:
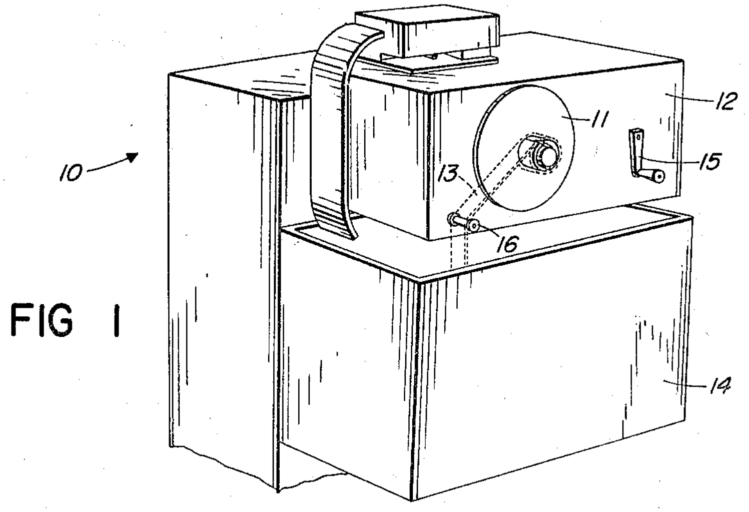

This invention relates in general to the spool winding of paper punched tapes, magnetic tapes, or film strips, and more particularly to a quick release tape spool that simultaneously releases the clamped inner end of the tape and simultaneously reduces the effective hub diameter upon manual actuation for quick and easy removal of wound tapes.

While there are various paper tape and magnetic tape spool winding devices commercially available, it does not appear that there has been available a spooling product mounted on a rotatably mounted backing disc for rotation therewith that grasps the inner end of the tape for spooling with a hub that has an enlarged diameter for the spool winding operation, and then, simultaneous release of the grasped inner end of the tape and effective hub diameter reduction upon manual actuation for quick and easy removal of wound tapes.

It is, therefore, a principal object of this invention to provide a tape spool winding drum hub device for tight winding of tape on the hub having a provision for quick manual release of tightly wound tape without entanglement and catching of a tape inner end.

A further object of such a tape spool winding hub device is to provide for easy grasping of the inner end of a tape to be wound, and then, after the tape is wound, for simultaneous tape grasping jaw release and reduction of effective spool winding hub diameter.

Still a further object is to provide such a tape spool winding hub having a single push button to open the tub tape inner end grasping jaws for tape inner end insertion, and later for hub grasping jaw release and simultaneous reduction of effective spool winding hub diameter for easy, quick tape load removal.

Features of this invention useful in accomplishing the above objects include a tape spooling hub of two-piece cylindrical construction. One of the cylindrical hub pieces fixed to a rotatably mounted backing disc and the other hub piece is pivotally mounted on the backing disc for movement from an outer maximum diameter tape spool winding and tape inner end grasping position to a simultaneous tape inner end grasp releasing and effective hub reduced diameter position. The tape spool winding hub structure also includes a central thumb actuated push button mounted for manual displacement axially inwardly from a resilient spring maintained outer position, on an inner guide hub mounted on the backing disc, to an inner position. The thumb actuated push button also includes a cammed surface extension that maintains the pivotally mounted hub piece in the outer maximum diameter tape spool winding position when the push button is in the outer manually released position. When the push button is manually pushed to the inner position the cammed surface extension permits the pivotally mounted member, as resiliently urged by a spring, to move to the tape inner end grasp releasing and effective hub reduced diameter position.

Figure 3:
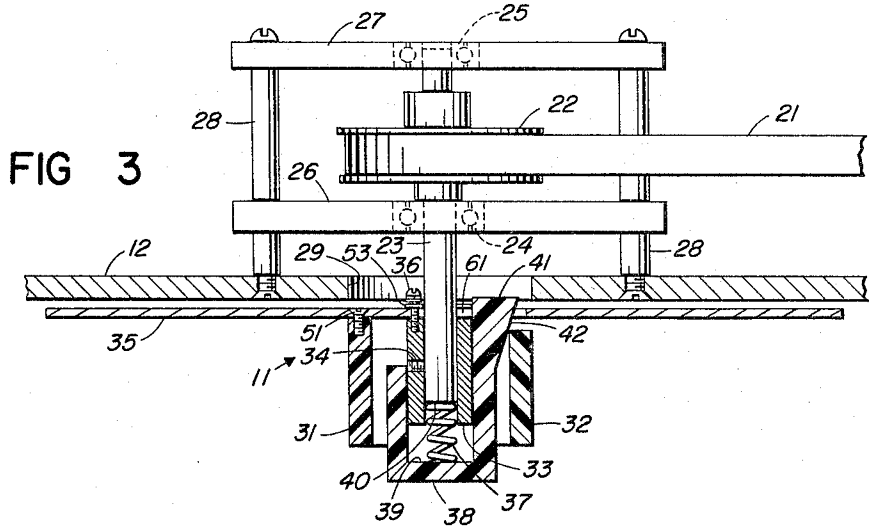
Figure 2:
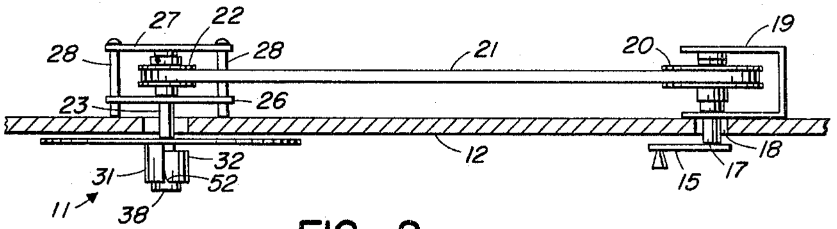
Figure 4:
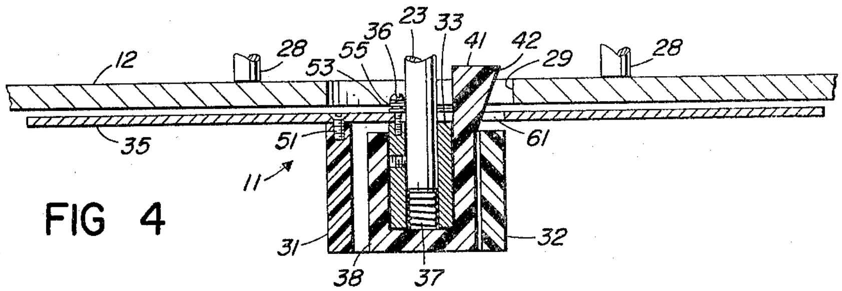
Figure 5:
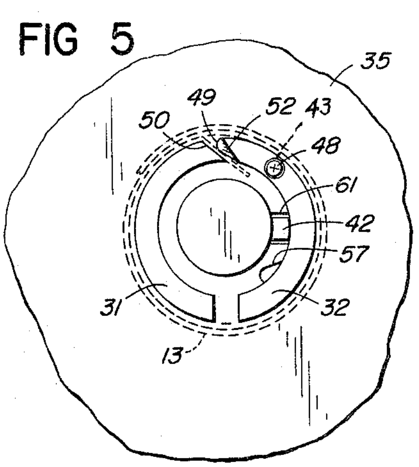
Figure 6:
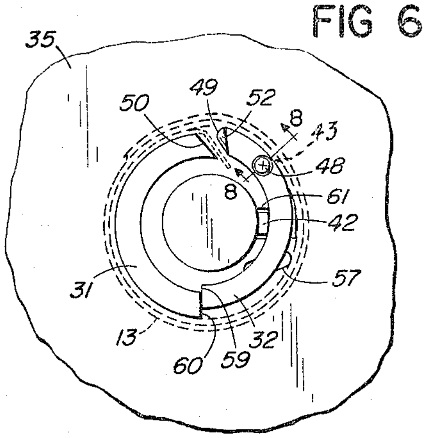
Figure 8:
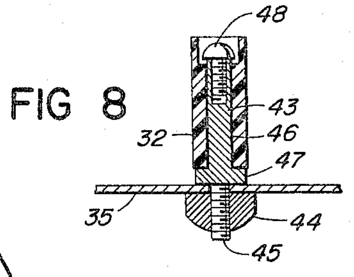
Figure 7:
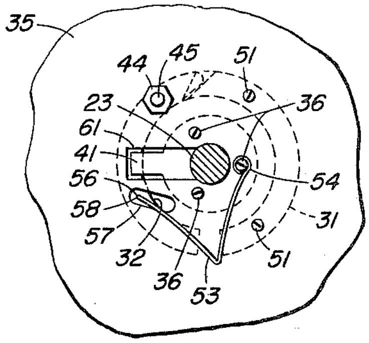

A specific embodiment representing what is presently regarded as the best mode of carrying out the invention is illustrated in the accompanying drawings:

In the drawings:

FIGURE 1 represents a perspective view of a paper tape reader/punch unit equipped with a quick release tape spooling device;

FIGURE 2, a partially cut away and sectioned view showing manual drive detail for the quick release tape spooling device;

FIGURE 3, an enlarged detailed view partly in section for greater detail, particularly through the quick release tape spooling device;

FIGURE 4, a section view similar to FIGURE 3, however, with the push button and the cammed surface extension manually displaced from the outward unactuated position of FIGURE 3 to the inward tape inner end inserting and tape inner end grasp releasing and effective hub reduced diameter position;

FIGURE 5, a front view showing the pivotally mounted and the fixed hub pieces in tape inner end grasping and expanded diameter tape coil winding relation consistent with the outer position push button condition of FIGURE 3;

FIGURE 6, a front view showing the pivotally mounted and fixed hub pieces in tape inner end inserting and reduced diameter tape inner end grasp releasing relation consistent with the manually inwardly displaced push button condition of FIGURE 4;

FIGURE 7, a rear view with hidden detail in phantom of the quick release tape spooling device; and FIGURE 8, a partial cross section view taken on line 8—8 of FIGURE 6 illustrating pivotal mounting detail of the pivotal piece of the two-piece cylindrical spooling hub.

Referring to the drawings:

The paper tape reader/punch unit 10 of FIGURE 1 is shown to be equipped with a quick release tape spooling hub device 11. This tape spooling device 11 is conveniently mounted on forward face panel 12 of the paper tape reader/punch unit 10 for the winding of tapes 13 grasped at an end by the spooling device 11 for coil winding from tape containing bin 14. The tape guide pin 16 is provided for proper tape feed guidance from bin 14 to the tape spooling device 11 during the tape spool coil winding process. Manual crank 15 is pivotally mounted on the forward face panel 12 of the paper tape reader/punch unit 10 as part of a manual drive for providing rotative tape spool coiling motion drive to the tape spooling device 11.

Referring now also to FIGURE 2, manual crank 15 is shown to have a shaft 17 extending through opening 18 in forward face panel 12 for rotatable mounting in a "U" shaped mounting structure 19 mounted on the back of panel 12 in a conventional manner. Shaft 17 mounts pulley 20 for rotation with crank 15 in driving pulley belt 21 and by means of pulley belt 21 imparting drive to pulley 22 which is fixed on drive shaft 23 of quick release tape spooling hub device 11.

Referring in addition to FIGURE 3, spooling hub drive shaft 23 is shown to be rotatably mounted by bearings 24 and 25 in mounting plates 26 and 27, respectively. Plates 26 and 27 are mounted in fixed spaced relationship by bolt and plate spacing structures 28 mounted to extend inwardly from the back of forward face panel 12. The rotatably mounted drive shaft 23 extends forwardly through a relatively large opening 29 in panel 12 to mount the tape spooling device 11 in relatively closely spaced yet freely relatively rotatable relation to the front of forward face panel 12. While tape spooling device 11 includes a tape spooling hub referred to as being of two-piece cylindrical construction, with two hub members 31 and 32 engaged by tape being wound thereon, it obviously includes additional components. These include a center hollow hub mounting and guide member 33 fixed on drive shaft 23 by set screw 34. The backing disc 35 of tape spooling hub device 11 is mounted by screws 36 to the inner end of the hub guide member 33.

It should be noted that the hub guide member 33 is so longitudinally fixed on shaft 23 as to give the desired spacing of backing disc 35 from the front of forward face panel 12. Furthermore, the outer end of hub guide member 33 extends beyond the outer end of shaft 23 to form a receiving pocket for spring 37. The hub guide member 33 also acts as an axial sliding surface guide for hollow push button member 38 which has an inner surface 39 against which spring 37 exerts resilient outward force since it is resiliently compressed between surface 39 and shaft end 40. This results in the hollow push button member 38 being continually resiliently urged toward the outer position shown in FIGURE 3. A longitudinally extended projection 41 of push button member 38 is provided with sloping cam surface 42 which cooperates with a rear edge corner of hub member 32 in an outer pivoted position as shown in FIGURE 3 to limit the outward longitudinal travel of push button 38 to substantially the position indicated in FIGURE 3.

Referring also to FIGURE 4, it is apparent that push button member 38 may be axially pressed inwardly on hub guide member 33 to an inward position limited by bottoming of push button inner surface 39 on the outer end of hub guide member 33 or perhaps by bottoming of spring 37. When push button 38 is manually depressed to the inward position, hub member 32 is permitted to pivotally move inwardly, with longitudinal movement of the sloping cam surface 42, from the position as indicated in FIGURES 3 and 5 to a position as indicated in FIGURES 4 and 6.

The half cylinder hub member 32 is pivotally mounted by a pivot pin 43 which, in turn, is mounted on backing disc 35 as shown in FIGURE 8. The pivot pin is fixed in place by a nut 44 tightly threaded on a threaded extension 45 of the pivot pin 43 extending through the backing disc 35. The cylindrical wall of the opening 46 through hub member 32 is a freely pivoting fit on the shank of pivot pin 43 between shoulder 47 and the head of a machine screw 48 tightly threaded into the outer end of pivot pin 43. It should also be noted that the pivot pin 43 mounting of hub member 32 is relatively closely spaced from the jaw 49 end of the hub member 32. Whenever hub member 32 is in the outermost pivoted position, such as shown in FIGURES 3 and 5, it is in tight tape 13 inner end grasping relation with the tape end between the grasping end 49 of pivotal hub member 32 and a slanted grasping end 50 of the other half cylinder hub member 31. This half cylinder hub member 31 is fixed in position on backing disc 35 by mounting screws 51. Obviously, when a tape inner end is not inserted between the grasping end 49 and grasping end 50 of the hub members, hub member 32 would assume a slightly greater outwardly pivoted position than that shown in FIGURE 5, but only to a negligible extent. Grasping end 49 is provided with a beveled tape end guiding insert surface 52 and is so rounded and shaped as to present, through the remaining longitudinal length of hub member 32 behind the beveled surface 52, substantially a line contact in pressing gripping relation to and through the tape inner end against gripping surface 50 of hub member 31.

A spring member 53 is pivotally mounted at end 54 for free rotative movement, with spring expansion and contraction, around a spacer 55 tightly retained between the head of a machine screw 36 and backing disc 35. The hairpin type spring 53 continually resiliently tries to close its two arms toward each other. Furthermore, the spring 53 is provided with an extension 56, at the other end from end 54, extending forwardly through slot 57 in backing disc 35 to be received in opening 58 of pivotal hub member 32. Thus, the spring 53 is connected to continually resiliently urge the pivotal hub member 32 radially inwardly from the tape inner end grasping position of FIGURES 3 and 5 to the tape inner end releasing and effective reduced hub diameter position of FIGURES 4 and 6. This inner pivoted position, as shown in FIGURE 6, is limited by abutment of pivotal hub member end 59 with end 60 of fixed hub member 31, provided the push button 38 and cam slope surface 42 have been manually inwardly displaced sufficiently far to permit movement of the pivotal hub member 32 to the inward limit position of FIGURE 6. Push button extension 41 with cam slope surface 42 extends through slot 61 in backing disc 35, and opening 29 in panel 12 is sufficiently large to provide clearance for any operational rearward extension of the tape spooling device 11.

It should be noted that the resilient force of spring 37 is opposed to and greater than the resilient force of hairpin spring 53. This spring relation in acting through pivotal hub member 32 riding on cam surface 42 of the push button extension 41 is such that spring 37 at all times, when manually released, returns the push button 38 and the pivotally mounted hub member 32, in riding along the cam surface 42 as the push button 38 is resiliently urged outward, to the relative outward positions as illustrated in FIGURES 3 and 5.

Thus, it may be seen that this invention provides a very effective and efficient easily used quick release tape spool drum hub winding device having easy insertion of a tape end in a manually actuated tape inner end grasping jaw for the start of tape coil winding. Furthermore, the tape spool winding hub device provides, after each tape is wound, for manually actuated simultaneous tape grasping jaw release and reduction of effective spool winding hub diameter for easy coil wound tape load removal.

Whereas this invention is here illustrated and described with respect to a specific embodiment thereof, it should be realized that various changes may be made without departing from the essential contribution to the art made by the teachings hereof.

We claim:

1. In a quick release strip material spooling hub device: a backing disc; means mounting said backing disc for rotative movement; a strip material spooling hub having two substantially half cylindrical section hub members; one of said cylindrical section hub members being fixed to said backing disc; pivot mounting means pivotally mounting the other of said cylindrical section hub members on said backing disc for movement between an outer position and an inner position; where, when said pivotally mounted cylindrical section hub member is in the outer position, the two substantially half cylindrical section hub members substantially define a cylindrical hub mounted on said backing disc; said cylindrical section hub members having adjacent strip material grasping ends so positioned relative to said pivot mounting means as to limit outer movement of said pivotally mounted cylindrical section hub member to said outer position by mutual abutment of the grasping ends, and when a strip material end is inserted, by substantially grasping abutment through such a strip material end by the grasping ends; and with the inner position of said pivotally mounted cylindrical section hub member, providing an effective reduced diameter hub, determined by inner position limiting means; means for pivoting said pivotally mounted cylindrical section hub member from said outer position to said inner position; and means for returning said pivotally mounted cylindrical section hub member from said inner position to said outer position; with said means for returning said pivotally mounted cylindrical section hub member from the inner position to the outer position including, a member having a single cammed surface; means mounting said member with the cammed surface for longitudinal movement back and forth along substantially the longitudinal axis of said spooling hub device between outer position and inner position limits; means establishing said outer position limit for said member having a single cammed surface; means establishing the inner limit position of said member having a cammed surface; and means urging said member having a cammed surface from said inner position to said outer position; with said means for pivoting said pivotally mounted cylindrical section hub member including spring means mounted in said hub device and connected to said pivotally mounted cylindrical section hub member; and with said means for returning said pivotally mounted cylindrical section hub member from said inner position to said outer position including, spring means resiliently urging said member having a cammed surface from its inner position limit toward its outer position limit; wherein said member with the single cammed surface includes a push button portion and is slidably mounted for longitudinal movement on said means mounting said member with the cammed surface; with said spring means urging said push button member with the cammed surface from the inner position limit toward the outer position limit being a resiliently compressed spring between said push button member and said means mounting the push button member; with said single cammed surface positioned to normally engage said pivotally mounted cylindrical section hub member and for that hub member to ride along the single cammed surface as said push button is longitudinally moved in and out.

2. The quick release strip material spooling hub device of claim 1, wherein said means for pivoting said pivotally mounted substantially half cylindrical section hub member includes, a spring anchored at one end in said backing disc of the spooling hub device and connected at the other end to said pivotally mounted cylindrical section hub member.

3. The quick release strip material spooling hub device of claim 1, wherein the single cammed surface is substantially perpendicular laterally and longitudinally slope shaped relative to a radial from the center axis of the hub device to permit movement of said pivotally mounted cylindrical section hub member inwardly with inward movement of said push button and for positively pivoting said pivotally mounted cylindrical section hub member outwardly as the push button is returned to its outer position limit.

4. The quick release strip material spooling hub device of claim 3, wherein the spring means urging said push button from the inner position limit toward the outer position limit has sufficient force in acting through the single cammed surface drive action in returning said pivotally mounted cylindrical section hub member from its inner position back to its outer position to accomplish this against the resilient resistive force of the spring means mounted in said hub device and connected to said pivotally mounted cylindrical section hub member.

References Cited by the Examiner

UNITED STATES PATENTS

| | | | |
|---|---|---|---|
| 3,058,686 | 10/1962 | Field | 242—68.3 |
| 3,093,338 | 6/1963 | Trapp | 242—72.1 |
| 3,124,319 | 3/1964 | Cohen et al. | 242—68.3 |

FRANK J. COHEN, *Primary Examiner.*

MERVIN STEIN, *Examiner.*

N. L. MINTZ, *Assistant Examiner.*